Aug. 2, 1955     K. JANISZEWSKI     2,714,422
TAPERED LEADER PIN AND DIE SHOE BUSHING ASSEMBLY
Filed Sept. 12, 1950
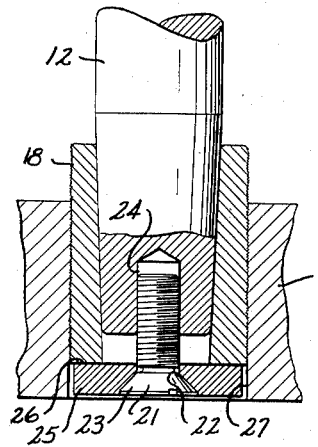
Fig. 1
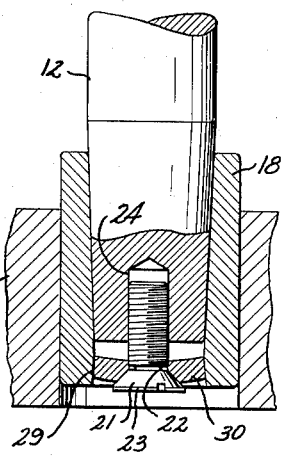
Fig. 2
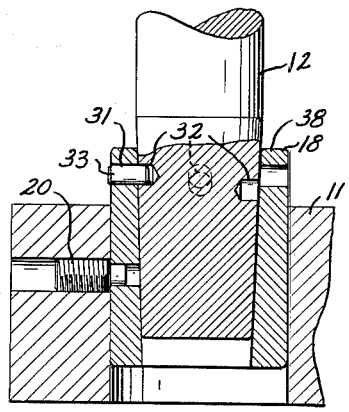
Fig. 3
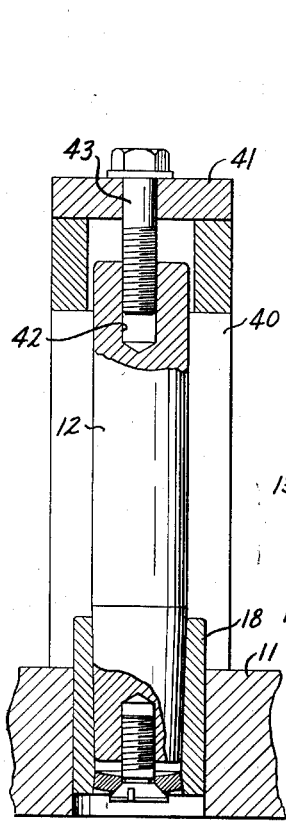
Fig. 5
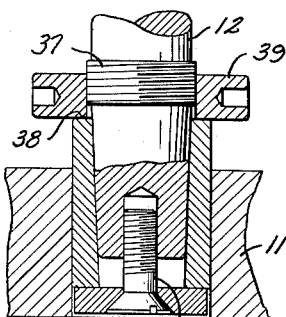
Fig. 4
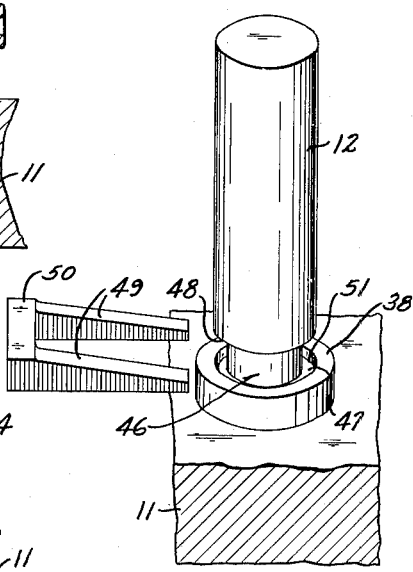
Fig. 6
Fig. 7   Fig. 8
INVENTOR
KASIMIR JANISZEWSKI
BY Wheeler, Wheeler & Wheeler
ATTORNEYS United States Patent Office 2,714,422
Patented Aug. 2, 1955

2,714,422

TAPERED LEADER PIN AND DIE SHOE BUSHING ASSEMBLY

Kasimir Janiszewski, Milwaukee, Wis.

Application September 12, 1950, Serial No. 184,367

12 Claims. (Cl. 164—118)

This invention relates to a tapered leader pin and die shoe bushing assembly.

The invention consists in the provision for complementary tapers between the leader pin and die shoe mounting, provision for frangible holding means between the leader pin and die shoe mounting, and provision for intentionally withdrawing the tapered leader pin from its die shoe mounting.

Effective operation of conventional die sets requires that the punch holder be accurately guided in its reciprocal movement towards and from the die shoe. For this purpose the platens of die sets are conventionally provided respectively with one or more leader pins and bushings telescopically bearing upon each other to serve as guides in the reciprocating movement of the respective parts.

When the nature of the work requires the punch holder to travel through a relatively long stroke, the leader pin may be of inadequate length to be retained within the punch holder bushing at the top of its stroke, and it is possible for a piece of scrap or the like to become wedged between the top of the leader pin and the bushing with sufficient tightness to withdraw the leader pin from its normally pressed fit in the die shoe.

In addition the leader pin may be so cramped by the scrap in its wedged position in the punch holder bushing as to be thrown out of axial alignment. Consequently upon the return stroke of the punch holder the pin may fail to enter the die shoe and may cause considerable damage to the die shoe, the leader pin, and the work. In the time that it takes to stop the press, sufficient damage may have been done to require the replacement of the various damaged parts.

It is a principal object of the invention to provide leader pins and die shoe mountings of such configuration as to lead the pin back into the mounting if inadvertent withdrawal occurs. In this connection, it is an object of the invention to provide the leader pin and the die shoe mounting with complementary tapers whereby the leader pin is self seating within the die shoe mounting.

It is a further object of the invention to provide frangible holding means between the die shoe mountings and leader pins which will securely position the leader pin within the die shoe mounting for all ordinary operation of the die set, but which will yield to any excessive pressure to permit the leader pin to be withdrawn without injury.

It is a further object of the invention to provide means for intentionally removing the leader pin from the die shoe in a simple and convenient manner without injury to the latter.

The improved and novel structure provided to accomplish the above objects contribute to a more accurately aligned reciprocal movement of the punch holder with respect to the die shoe with resultant improvement in quality of the work performed.

Other objects of the invention will be more apparent to one skilled in the art upon an examination of the following disclosure.

In the drawings:

Fig. 1 is an axial cross sectional view of a tapered leader pin and die shoe bushing with one form of frangible holding means therebetween.

Fig. 2 is a similar axial cross sectional view of a tapered leader pin and its tapered die shoe bushing with a modified form of frangible holding means therebetween.

Fig. 3 is an axial cross sectional view of a tapered leader pin and tapered die shoe bushing with a still further modified form of frangible holding means therebetween.

Fig. 4 is an axial cross sectional view of a tapered leader pin and tapered die shoe bushing showing one embodiment of a means for intentionally withdrawing the pin from the bushing.

Fig. 5 is a similar axial cross sectional view showing a different form of means for intentionally withdrawing the pin from the bushing.

Fig. 6 is a perspective view of a still further modification of a means for intentionally withdrawing the leader pin from the bushing.

Fig. 7 is a side elevational view in reduced scale showing a piece of scrap about to become wedged between the punch holder bushing and the leader pin.

Fig. 8 is a similar side elevational view in reduced scale showing a subsequent position of the punch holder after the piece of scrap has become wedged between the punch holder bushing and the leader pin, and the leader pin has been withdrawn from the die shoe bushing.

As best shown in Figs. 7 and 8, the conventional die set comprises a die shoe 11 and a punch holder 10 which is reciprocal toward and from the die shoe in the course of die set operation. A leader pin 12 is rigidly mounted in the die shoe 11 normal to the plane of the die shoe and is telescopically receivable within a bushing 13 which is seated in a suitable aperture in the punch holder 10 in axial alignment with the leader pin. By virtue of the rigid mounting of the leader pin and the close tolerances permitted between the pin and the inner bore of the punch holder bushing 13, the reciprocal movement of the punch holder with respect to the die shoe is very accurately guided.

Misalignment may, however, be introduced as is diagrammatically shown in Figs. 7 and 8. The stroke of the punch holder 10 in certain circumstances may be of such a length as to raise the bushing 13 above the top of the leader pin 12 to momentarily leave a space therebetween. A piece of scrap, shown for the purpose of illustration at 14, may find its way into this space and become wedged between the pin and bushing, as shown in Fig. 8, when the punch holder re-registers the pin and bushing on its downward stroke. The wedged scrap may so tightly bind the leader pin against the punch holder bushing as to forcibly withdraw the pin from its mounting in the die shoe upon the next succeeding upward stroke of the punch holder. The cramped position of the wedged scrap 14 may cause the pin to tilt in its newly acquired punch holder mounting so as to be thrown out of axial alignment with its die shoe mounting.

In order to correct this situation it was heretofore necessary to stop the press and reseat the leader pin in the die shoe and perhaps even to replace the leader pin and other damaged portions of the die set.

The present invention recognizes the possibility of the occurrence of such misalignment but automatically corrects the misalignment by providing the leader pin 12 and a mounting therefor comprising a die shoe bushing 18, the pin and mounting having complementary tapers which insure reseating of the leader pin in the event of accidental withdrawal.

By virtue of the complementary tapers on the bushing 18 and leader pin 12 the leader pin will be led back to seating connection with the bushing 18 to a depth within the bushing dependent upon the degree of taper and the force exerted downwardly upon the pin. Even though successively withdrawn from the die shoe bushing the leader pin will successively reseat itself to maintain the reciprocating alignment of the die parts and keep itself out of damaging contact with the bushing.

As best shown in Fig. 1, the bushing 18 may be provided with a roughened outer periphery so as to be semi-permanently mounted in pressed fit relationship in a suitable aperture within the die shoe 11. The bushing 18 may be further securely held within the die shoe 11 by means of the set screw 20 as shown in Fig. 3.

Although the tapered fit may of itself be adequate to hold the leader pin relatively rigid in order to prevent the leader pin from being accidentally withdrawn, it is preferred to make the angle of taper less acute and to provide supplemental frangible holding means between the bushing and the leader pin to insure a rigid aligned position of the pin. The holding means is made frangible so that large upward forces exerted upon the leader pin effective to wrench the pin from the die shoe mounting will rupture the frangible holding means and thus will not result in damage to the mounting itself.

One type of frangible holder comprises a screw 21 having a weakened neck 22 and a head 23, as shown in Figs. 1 and 2. The leader pin is provided with an axial tap 24 and the bushing is provided with a transverse bridge member which comprises, in Fig. 1, an apertured washer 25 which fits into an annular recess between the bottom margin 26 of the bushing and the side walls 27 of the apertured die shoe. The washer bridges the open lower end of the die shoe bushing and acts as an anchor plate for the head 23 of screw 21.

In Fig. 2 the bushing 18 is provided with a reverse taper 29 near its lower end and the anchor plate comprises a dished washer 30 having its peripheral edges formed to a taper complementary with the reverse taper 29 so as to seat the washer against the bushing taper as illustrated. The washer 30 is also provided with a countersunk central aperture to receive the head of screw 21 in a fashion similar to that shown in Fig. 1. In either case the screw 21 serves to rigidly hold the leader pin within the mounting for all ordinary purposes but provides a weakened or frangible link in the seating bond between the leader pin and the bushing which will fail under a sudden large upward thrust on the leader pin so as to permit the leader pin to be withdrawn without injury to the bushing. In order to reseat the pin it is only necessary to replace the screw.

In Fig. 4 an intermediate stage in the initial seating of the leader pin 12 in the die shoe bushing 18 is illustrated. A non-frangible screw 36 is used for drawing the leader pin into its bushing 18. After the pin is properly seated and aligned the screw 36 is replaced by frangible screw 21.

The frangible screws just described are subject to rupture in tension; in Fig. 3 frangible holding means are provided which rupture in shear. The bushing 18 is provided at an exposed portion extending above the die shoe with an arcuate series of lateral passages 31 which selectively register with a helical series of radial sockets 32 in the leader pin. A shear pin 33 or the like may be positioned into a registering passage and socket. The pin 33 is made of the usual soft metal which will shear upon a forcible upward thrust of the leader pin so as to yield before the bushing is wrenched from its seat. The helical arrangement of the leader pin sockets facilitates alignment of a socket with a die shoe bushing passage regardless of the depth to which the pin was seated on the return stroke of the punch holder. Consequently the leader pin may be tapped to an aligned position without disturbing the die set-up and die set operation may be resumed almost immediately after removing the scrap 14 from wedged position. It is to be noted that the upper portion of die shoe bushing 18 is elevated slightly above the surface level of the die shoe. Such elevation exposes the bushing passages 31 for ready insertion of the shear pin 33.

From the foregoing it is seen that the tapered leader pin and bushing, in combination with the frangible means for holding the pin in seated position, permit the accidental forced removal of the pin from its bushing and its return without damage to the various parts.

In order to facilitate intentional removal of the leader pin from the die shoe bushing without damage to the parts, several related withdrawing means are provided for developing axial thrust between the leader pin and die shoe.

In Fig. 4 the leader pin 12 is provided with peripheral threads 37 which are disposed normally proximate the upper shoulder 38 of bushing 18. The leader pin is further provided with a nut 39 rotatable upon the threads to bring its lower face into contact with the bushing shoulder 39 so as to develop thrust between said shoulder and the threads 37 to withdraw the pin gently from the bushing. Of course, the frangible bolt or shear pin must be first disengaged before the leader pin and bushing are thus separated, it being understood that any disclosed device for pin withdrawal may be used with any disclosed pin.

In Fig. 5 the withdrawing means comprises a yoke 40 which may be positioned between the separated die set parts to rest on its base upon the upper surface of the die shoe 11. The respective legs of the yoke are bridged by a cross member 41 which extends directly over the top of the leader pin. The leader pin is provided with an axial tap 42 which may be engaged by the threads of a bolt 43 pendent from the cross member 41. Proper rotation of the bolt 43 will develop thrust between the threads of the leader pin tap 42 and the die shoe through the yoke to gently withdraw the leader pin from the bushing 18.

In Fig. 6 the leader pin 12 is provided with an annular peripheral groove shown generally at 46 and having axially spaced opposite groove walls or shoulders 47 and 48. The width of the groove is such that when the leader pin is properly seated in the die shoe bushing, the bushing shoulder 38 is spaced above the lower groove wall 47 as shown at 51. The space between shoulder 38 and the upper groove wall 48 admits the inclined arms 49 of a wedge 50. By forcing the wedge arms 49 between the upper groove wall 48 of the leader pin and a bushing shoulder 38, thrust is developed between the pin and die shoe to gently withdraw the pin from its bushing. The clearance space 51 between the lower groove wall 48 and the bushing shoulder 38 permits the leader pin to move upwardly until freed from binding engagement with the bushing.

From the foregoing description taken in connection with the accompanying drawings it is seen that a tapered leader pin and a tapered die shoe bushing are provided to cooperate in a manner to facilitate re-entry of the pin in the bushing and insure against damage to the bushing and die shoe in the event the leader pin is accidentally withdrawn from its mounting. In addition, frangible means are provided whereby the leader pin may be securely held within the bushing under normal circumstances but which will yield upon a sudden forceful withdrawal of the leader pin from the bushing thereby protecting the bushing and leader pin from damage. Means are also provided to facilitate intentional removal of the leader pin from its mounting without damage to the parts.

I claim:

1. In a die set comprising relatively reciprocable first and second platens, said first platen being provided with a first tubular bushing, the combination of a second tubular bushing mounted in the second platen and axially aligned with the first bushing, said second bushing being provided with a bore wall tapered in a direction to reduce its cross section axially away from the first bushing, and a leader pin having one end telescopically receivable in said first tubular bushing and having an axial taper at its other end complementary to the wall taper of the second bushing, said leader pin being positioned in axial alignment with the first bushing when said tapers mate, said leader pin having its respective ends engaged in both bushings in a proximate relative position of said platens, the tapered end of said leader pin affording quick relief of tension in the event of forceable removal from said tapered bushing during the separation of said platens if the pin wedges in the first bushing, the said complementary tapered surfaces of the pin and the second bushing comprising means for returning said leader pin into the tapered bore of said second bushing without damaging contact of the pin with the second bushing in a subsequent relative approach of the platens, even if the pin has been displaced consequent upon said wedging.

2. The device of claim 1 in further combination with means for releasable anchoring said leader pin in said bushing and comprising frangible means mutually engaged with said leader pin and bushing.

3. The device of claim 2 wherein the frangible means comprises a shear pin having its ends in the pin and bushing and disposed transversely of the leader pin axis at the mating tapers of said pin and bushing.

4. The device of claim 3 wherein the bushing has an exposed portion extending above the level of the second platen, said bushing being provided at such exposed portion with a series of arcuately spaced radial passages extending through the bushing wall, said leader pin being provided with a series of arcuately spaced radial sockets selectively registerable with the bushing passages, the sockets of said series being helically disposed with respect to the leader pin axis.

5. In a die set having a leader pin bushing to slidably receive said pin, the combination of leader pin having a tapered end and a mounting bushing with a complementary tapered socket, said mounting bushing being coaxial with said leader pin bushing, said mounting bushing being provided with a transverse anchor beyond the bushing, and frangible pin securing means comprising a screw threaded in the leader pin and having a weakened neck and a head engaged with said transverse anchor.

6. The device of claim 5 wherein the anchor comprises a washer peripherally engaging the bushing and having a central aperture in which the head of the screw is seated.

7. In a die set having a leader pin bushing to slidably receive said pin, the combination of leader pin having a tapered end and a mounting bushing with a complementary tapered socket, said mounting bushing being coaxial with said leader pin bushing, said mounting bushing being provided with a transverse anchor beyond the bushing, and frangible pin securing means comprising a screw threaded in the leader pin and having a weakened neck and a head engaged with said transverse anchor, said mounting bushing being provided with a reverse taper near said end margin and said transverse anchor comprises a washer having a peripheral edge tapered complementarily with said reverse taper and wedged against said reverse taper.

8. In a die set including first and second platens, a bushing in said first platen to slidably receive a leader pin, and a mount for said leader pin in said second platen, said mount and leader pin having complementary tapers opening toward said first platen whereby said leader pin is releasably mounted in said mount, the combination with said mount and leader pin of means for axially separating said leader pin and mount comprising means for developing axial thrust between said mount and pin whereby to withdraw said pin from said mount, said leader pin is provided with an axial tap at its end remote from its tapered end, said withdrawing means comprising a yoke removably positioned on the second platen, and a bolt rotatably pendent from said yoke for axial engagement with said leader pin tap to withdraw the pin.

9. In a die set including first and second platens, a bushing in said first platen to slidably receive a leader pin, and a mount for said leader pin in said second platen, said mount and leader pin having complementary tapers opening toward said first platen whereby said leader pin is releasably mounted in said mount, the combination with said mount and leader pin of means for axially separating said leader pin and mount comprising means for developing axial thrust between said mount and pin whereby to withdraw said pin from said mount.

10. The device of claim 9 wherein the leader pin is provided with threads disposed proximate the leader pin taper and with a nut carried on said threads and rotatable into contact with said second platen mount to develop axial thrust between said leader pin and mount to withdraw the pin from the mount.

11. The device of claim 9 wherein the leader pin is provided with an annular groove proximate its taper to present spaced annular shoulders, one of said shoulders being normally disposed below the surface level of the second platen mount and the other of said shoulders being normally disposed above said second platen mount surface level, and wherein the withdrawing means comprises a wedge insertable between the exposed shoulder and mount surface whereby lateral movement of said wedge will develop axial thrust between said pin and mount to withdraw the pin from the mount.

12. The device of claim 11 wherein the wedge is bifurcated to comprise spaced inclined arms which span the base of the leader pin groove.

References Cited in the file of this patent

UNITED STATES PATENTS

| Number | Name | Date |
|---|---|---|
| 1,243,364 | Walker | Oct. 16, 1917 |
| 1,669,700 | Egbert | May 15, 1928 |
| 1,878,696 | Hassel | Sept. 20, 1932 |
| 1,951,537 | Thompson | Mar. 20, 1934 |
| 1,958,621 | Heppenstall | May 15, 1934 |
| 2,013,488 | Carrier | Sept. 3, 1935 |
| 2,064,921 | Kinsella et al. | Dec. 22, 1936 |
| 2,212,678 | Whistler et al. | Aug. 27, 1940 |
| 2,213,227 | Persson | Sept. 3, 1940 |
| 2,317,791 | Miller | Apr. 27, 1943 |
| 2,433,617 | Marsilius | Dec. 30, 1947 |